United States Patent [19]
Sims, Jr.

[11] Patent Number: 4,609,955
[45] Date of Patent: Sep. 2, 1986

[54] LATCHING MECHANISM FOR A TAPE CARRIER

[75] Inventor: Dewey M. Sims, Jr., Wayne, Mich.

[73] Assignee: Northern Telecom Limited, Montreal, Canada

[21] Appl. No.: 542,408

[22] Filed: Oct. 17, 1983

[51] Int. Cl.$^4$ .................... G11B 15/00; G11B 5/008; G11B 23/04
[52] U.S. Cl. .................... 360/93; 360/96.5; 242/198
[58] Field of Search .................... 360/93, 96.1, 96.5, 360/96.6, 132; 242/197–199

[56] References Cited

U.S. PATENT DOCUMENTS

| | | | |
|---|---|---|---|
| 3,829,033 | 8/1974 | Cousino | 360/93 X |
| 3,924,823 | 12/1975 | Cohen et al. | 242/198 |
| 3,957,225 | 5/1976 | Vogel | 242/198 |
| 3,976,262 | 8/1976 | Kennedy | 242/198 |
| 3,977,624 | 8/1976 | Leifer et al. | 242/198 |
| 4,085,906 | 4/1978 | Dahl et al. | 242/192 |
| 4,156,260 | 5/1979 | Joshi | 360/96.1 |
| 4,199,795 | 4/1980 | Hunter | 360/93 |
| 4,303,955 | 12/1981 | Kramer et al. | 360/93 |
| 4,337,908 | 7/1982 | Sims, Jr. | 242/198 |

FOREIGN PATENT DOCUMENTS

| | | | |
|---|---|---|---|
| 56-71847 | 6/1981 | Japan | 360/96.5 |

OTHER PUBLICATIONS

Stock, "Magnetic Tape Cartridge Holder", IBM Technical Disclosure Bulletin, vol. 18, No. 3, Aug. 1975.

*Primary Examiner*—Stuart N. Hecker
*Assistant Examiner*—Benjamin E. Urcia
*Attorney, Agent, or Firm*—Schwartz, Jeffery, Schwaab, Mack, Blumenthal & Evans

[57] ABSTRACT

A device of relatively simple construction for holding and latching a tape cartridge (or the like) is disclosed. The device comprises two spaced apart guide rails, one on each side of a recess for accepting a tape cartridge, whereby the guide rails serve to mate with corresponding grooves in the tape cartridge for receiving and guiding the cartridge into position. Two resilient biasing members are positioned adjacent the guide rails, in a one-to-one relationship, for acting against a common face of the cartridge to bias the cartridge against the guide rails. Each biasing member includes a projection for engaging a corresponding notch in the cartridge so as to inhibit the removal of the cartridge. The biasing members are contructed such that an appropriate movement of the cartridge results in the projections disengaging from the notches and allowing the cartridge to be removed (i.e. a separate release mechanism is not required).

7 Claims, 6 Drawing Figures

4,609,955

LATCHING MECHANISM FOR A TAPE CARRIER

BACKGROUND OF THE INVENTION

This invention relates generally to the field of tape recording, and more particularly to a latching aechanism for securing a tape carrier (such as a tape cartridge) to a tape machine.

Tape cassettes and tape cartridges are two well known types of tape carriers. One standard type of tape cartridge is the model DC-300A data cartridge manufactured by 3M (Minnesota Mining and Manufacturing Co.).

Many schemes have been proposed to hold and latch a tape cartridge into a tape machine. The following U.S. patents depict some of these various schemes and attention is directed to them:

U.S. Pat. No. 4,337,908 issued July 6, 1982 to D. M. Sims Jr.;

U.S. Pat. No. 4,156,260 issued May 22, 1979 to U. W. Joshi;

U.S. Pat. No. 3,976,262 issued Aug. 24, 1976 to C. J. Kennedy;

U.S. Pat. No. 3,957,225 issued May 18, 1976 to G. G. Vogel; and

U.S. Pat. No. 3,977,624 issued Aug. 31, 1976 to N. A. Leifer et al.

Briefly stated, the previous schemes for holding and latching the cartridge into a tape machine incorporate two rails, one on each side of the recess designed to accept the tape cartridge. The rails are situated so as to mate with two grooves, one on each side of the cartridge, and guide the cartridge into the recess, and to become properly positioned relative to the tape head and tape drive mechanism.

In addition to the previously mentioned rails, there is also a latching mechanism to retain the cartridge in its proper position. This latching mechanism also commonly includes a provision for providing the fine positioning of the cartridge (see for example, the aforementioned U.S. Pat. No. 4,156,260).

As can be seen from a review of the existing cartridge latching mechanisms, the mechanisms can be relatively complex and involve the use of interacting components and springs.

Aforementioned U.S. Pat. Nos. 3,957,225 and 3,977,624 are perhaps the least complicated of the cited references. Even they, however, are not as simple as they might be. This will become more apparent as the present invention is described in detail and its relative simplicity appreciated. In short, aforementioned U.S. Pat. No. 3,957,225 employs a helical spring 35, a spring guide 37, a pivot guide 41 into which spring guide 37 is allowed to freely pass, etc. Aforementioned U.S. Pat. No. 3,977,624 employs a helical spring 59, and each cam 50 has a slot 58 in which a spring slide 64 moves.

SUMMARY OF THE INVENTION

The present invention is directed to reducing much of the complexity of the prior tape holding and latching mechanisms and to providing a relatively simple, yet effective, cartridge holding and latching mechanism.

In the preferred embodiment of the present invention the holding and latching mechanism comprises, as its essential elements, two guide rails and a sheet of metal cut and bent into a specific shape. In somewhat more detail, the guide rails are positioned so as to straddle the recess which accepts the tape cartridge and, during insertion of the cartridge, to mate with the two grooves, one on each side of the cartridge, and to guide the cartridge into the proper position.

The sheet metal piece is bent so as to bias the cartridge against the rails and it includes two small "fingers" for engaging two notches located in tne base of the tape cartridge (a standard feature of the aforementioned 3M cartridge). A resilient stop limits the forward motion of the cartridge and biases it against the fingers. The cartridge is removed by pressing down on the back part of the cartridge (i.e. that part closest to the "mouth" of the holding and latching mechanism) which causes the "fingers" to disengage from the notches of the cartridge and the cartridge is then slid from the latching mechanism by the human operator.

Stated in other terms, the present invention is a latching mechanism for a tape carrier, the mechanism characterized by: two spaced apart guide rails, one on each side of a recess for accepting a tape carrier, the guide rails serving to receive and to guide the carrier into position; two resilient biasing members positioned adjacent the guide rails, in a one-to-one relationship, for acting against a common face of the tape carrier to bias the carrier against the guide rails; each biasing member including a projection for engaging a corresponding notch in the tape carrier so as to inhibit the removal of the carrier wherein movement adjacent a mouth of the recess of an inserted and latched tape carrier in a direction substantially perpendicular to the guide rails pivots the tape carrier against the lower surface of said guide rails so as to move the biasing members sufficiently to allow the projections to clear the notches and to thereby permit the carrier to be removed.

Stated in still other terms, the present invention is a cartridge latching mechanism, the mechanism characterized by: a pair of spaced apart guide rails, straddling a recess for accepting a cartridge, the guide rails serving to receive and to guide the cartridge into position; a pair of resilient members positioned adjacent the guide rails, in a one-to-one relationship, for acting against a common face of the cartridge in order to bias it against the guide rails, in a direction generally perpendicular to the direction of insertion of the cartridge; the resilient members being supported in a cantilevered fashion with their fixed ends adjacent the aouth of the recess and their free ends remote from the mouth; the resilient members having a shape that results in the free ends of the resilient members being closer to the guide rails than the fixed ends, and the free ends each including a projection means for accessing a notch in the cartridge wherein movement adjacent the mouth of the recess of the cartirdge in a direction substantially perpendicular to the guide rails pivots the cartridge against the lower surface of said guide rails so as to move the biasing members sufficiently to allow the projections to clear the notches and to thereby permit the cartridge to be removed.

BRIEF DESCRIPTION OF THE DRAWINGS

The invention will now be described in more detail with reference to the accompanying drawings, wherein like parts in each of the several figures are identified by the same reference character, and wherein.

DETAILED DESCRIPTION

Figure 1:
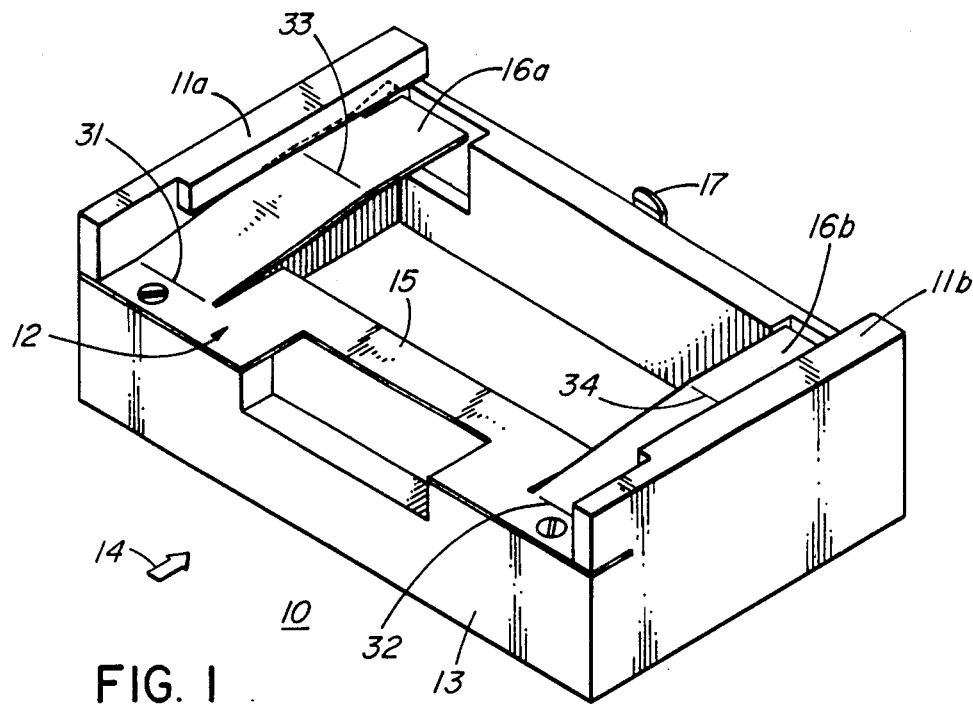
FIG. 1 is a perspective view of a tape holding and latching device constructed according to the present invention.

FIG. 1 is a simplified perspective view of cartridge latching mechanism 10, constructed according to a preferred embodiment of the present invention. Mechanism 10 comprises guide rails 11a and 11b (referred to collectively as guide rails 11) and latching plate 12. Both guide rails 11 and latching plate 12 are supported by base frame 13.

A tape cartridge 18, such as a model DC-300A by 3M (FIG. 4), is inserted into mechanism 10 in the direction shown by arrow 14. As the tape cartridge is being inserted it is guided by rails 11. Note that the height of rails 11 is less than the height of the mating groove in the tape cartridge (e.g. rail 11 height of approximately 0.3 inches compared to a groove height of approximately 0.45 inches). This amount of play is necessary to allow for the unlatching of the cartridge as will become more apparent as the description proceeds.

It should be noted that latching plate 12 has arms 16a and 16b which are resiliently biased against guide rails 11a and 11b respectively (when no cartridge is in place). When a tape cartridge is inserted, arms 16a and 16b contact the bottom of the cartridge and bias the cartridge against the lower surface of rails 11a and 11b so as to accurately position it. The cartridge is inserted (by a human operator) until its forward motion is limited by resilient stop 17.

Figure 4:
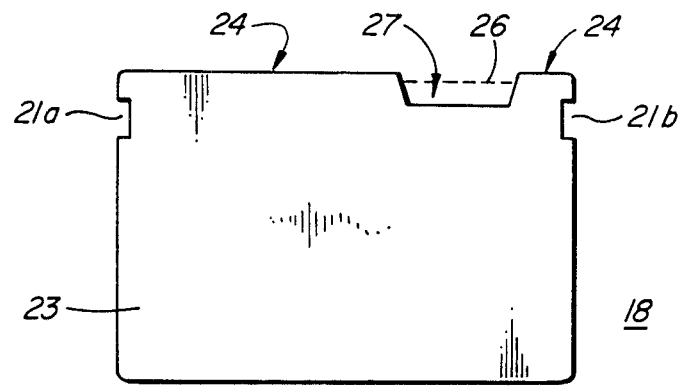
FIG. 4 is a simplified plan view of the bottom plate of a tape cartridge upon which the present invention operates in performing its latching function.

During the insertion of tape cartridge 18, at approximately the point in time that the forward most part (i.e. leading edge 24; FIG. 4) of cartridge 18 is just contacting stop 17, fingers 19a and 19b (see FIG. 2) of arms 16a and 16b respectively are just engaging notches 21a and 21b, respectively, of cartridge 18. Resilient stop 17 allows the leading edges (28a and 28b, FIG. 5; referred to collectively as edges 28) of notches 21 to move just beyond the ends of fingers 19, thereby ensuring that fingers 19 become inserted into notches 21. As the human operator releases cartridge 18 (after insertion), resilient stop 17 biases cartridge 18 in a direction opposite to the insertion direction and causes the leading edges 28 (FIG. 5) of notches 21 to be biased against the free ends of fingers 19, thus holding cartridge 18 firmly in position.

Figure 2:
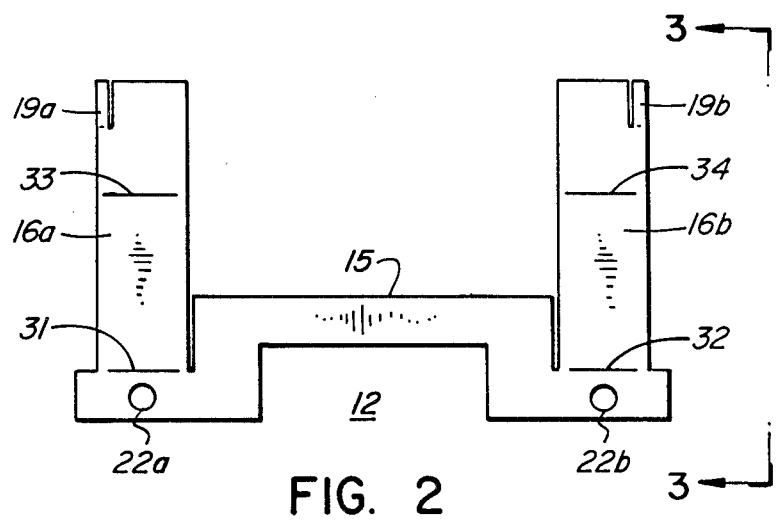
FIG. 2 is a plan view of one of the component pieces of the present invention.
Figure 3:
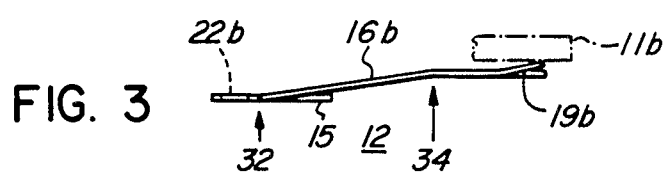
FIG. 3 is a cross-section of the FIG. 2 view taken along the section line 3—3.

FIGS. 2 and 3 depict latching plate 12 in more detail. FIG. 2 is a plan view and FIG. 3 is a sectional view taken along the section line 3—3 of FIG. 2; these two Figures will be described together. Latching plate 12 comprises arms 16a and 16b and support member 15, joining the two arms 16a and 16b as depicted. Arm 16a contains two bends 31 and 33 as depicted; similarly, arm 16b contains two bends 32 and 34 as depicted. Two screw holes 22a and 22b are also depicted; these are of course used to facilitate the mounting of plate 12 to base frame 13. Plate 12 is bent to produce approximately the shape depicted in FIG. 3 (when plate 12 is installed on base frame 13). In FIG. 3, plate 12 is depicted mounted to base frame 13 and finger 19b is depicted contacting guide rail 11b (i.e. cartridge 18 is not inserted). Note that FIG. 2 is approximately to scale and that arms 16 are approximately 3.75 inches long (from the front of plate 12 to their extremities). The width of plate 12 (at its widest) is approximately 6.5 inches. The total rise in FIG. 3, from the top of the lowest part of plate 12 to the bottom of rail 11b is approximately 0.3 inches. Note also that plate 12 is made of 0.036 inch thick spring steel.

FIG. 4 will now be described briefly. As mentioned earlier, FIG. 4 is a plan view of baseplate 23 (of cartridge 18) depicting notches 21a and 21b and leading edge 24. Dashed line 26 shows the approximate route taken by the tape across recess 27 of baseplate 23; this is where the tape is exposed so as to enable the tape head (not shown) to record and play back from the tape. Note that the FIG. 4 view is looking down on tape cartridge 18 (i.e. from above) with the tape and casing omitted from the Figure so as not to obscure baseplate 23.

Figure 5:
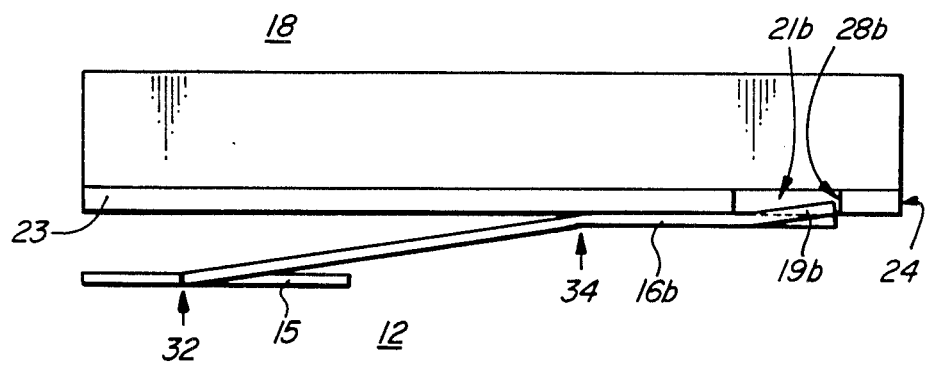
FIG. 5 is a simplified side view of the present invention, depicting a tape cartridge latched in place.

FIG. 5 is a cut-away, simplified side view of the invention, depicting the interaction between tape cartridge 18 and latching plate 12. As can be seen from FIG. 5, cartridge 18 is latched into place (i.e. is "fully home"). Arm 16b is depicted biasing cartridge 18 up against rail 11b (FIG. 1). Finger 19b is inserted into notch 21b of baseplate 23 of cartridge 18. Resilient stop 17 (FIG. 1) biases baseplate 23 to the left in FIG. 5 and thereby ensures that the free end of finger 19b makes positive contact with edge 28b of notch 21b as depicted in FIG. 5.

Figure 6:
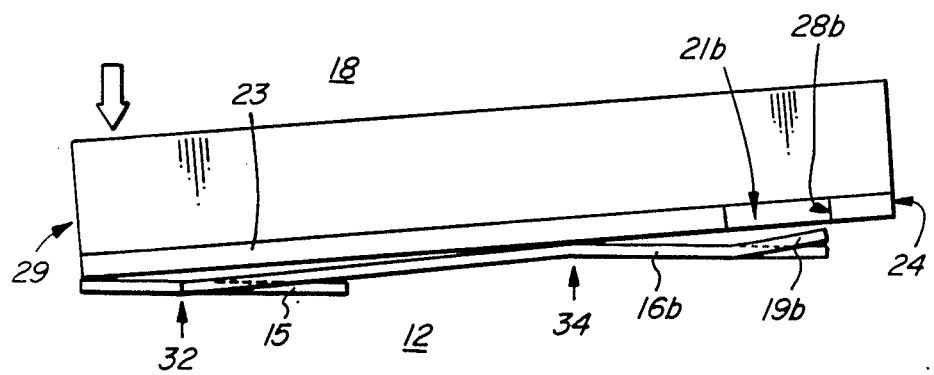
FIG. 6 is similar to FIG. 5 but depicts the tape cartridge in its unlatched position.

FIG. 6 is similar to FIG. 5, but depicts cartridge 18 in the process of being unlatched, just prior to ejection. As can be seen from FIG. 6, trailing end 29 of cartridge 18 has been moved towards latching plate 12 (via the normal force of a human operator's hand). This action has caused cartridge 18 to pivot approximately about leading edge 24 and has forced the free end of arm 16b away from cartridge 18 with the result that finger 19b no longer protrudes into notch 21b of baseplate 23. As a result, cartridge 18 can now be slid to the left (in FIG. 6) and consequently be removed from the mechanism (via normal human forces); no special or separate mechanism is required to eject cartridge 18. It is this pivotal action in unlatching that necessitates the relatively large dimensional differences between the guide rails 11 and grooves of the cartridge, mentioned earlier. If the guide rails 11 were a close fit to the grooves in cartridge 18 there would not be enough pivotal aovement to allow cartridge 18 to unlatch from baseplate 23. Note also that it is the existence of bends 33 and 34 that cause the free ends of arms 16a and 16b to move away from the cartridge during the unlatching process.

What is claimed is:

1. A latching mechanism for a tape carrier, said mechanism characterized by:
    two spaced apart guide rails, having upper and lower surfaces thereon, one on each side of a recess for accepting a tape carrier, said guide rails serving to receive and to guide said carrier into position;
    two resilient biasing members positioned within the recess adjacent said guide rails, in a one-to-one relationship, for acting against a common face of said tape carrier to bias said carrier against said lower surface of the guide rails;
    each said biasing member being formed from a single piece of sheet metal and including a projection for engaging a corresponding notch in said tape carrier so as to inhibit the removal of said carrier;

wherein movement adjacent a mouth of the recess of an inserted and latched tape carrier in a direction substantially perpendicular to the guide rails pivots said tape carrier against said lower surface of said guide rails so as to move said biasing members sufficiently to allow said projections to clear said notches and to thereby permit said carrier to be removed.

2. The latching mechanism of claim 1 further including a resilient stop means for limiting the movement of said tape carrier upon insertion.

3. The latching mechanism of claim 1 wherein said biasing members are mounted in a cantilevered fashion with their fixed ends adjacent and within the mouth of the recess and their free ends, supporting said projections, remote from said mouth.

4. The latching mechanism of claim 3 wherein said tape carrier is a tape cartridge.

5. A cartridge latching mechanism, said mechanism characterized by:
a pair of spaced apart guide rails having upper and lower surfaces thereon, straddling a recess for accepting a cartridge, said guide rails serving to receive and to guide said cartridge into position;
a pair of resilient members positioned within the recess adjacnet said guide rails, in a one-to-one relationship, for acting against a common face of said cartridge in order to bias it against said lower surface of said guide rails, in s direction generally perpendicular to the direction of insertion of said cartridge;
said resilient members being supported in a cantilevered fashion with their fixed ends adjacent and within a mouth of the recess and their free ends remote from said mouth;
said resilient members being formed from a single piece of sheet metal and having a shape that results in the free ends of said resilient members being closer to said guide rails than said fixed ends, and said free ends each including a projection means for accessing a notch in said cartridge,
wherein movement adjacent the mouth of the recess of the cartridge in a direction substantially perpendicular to the guide rails pivots said cartridge against said lower surface of said guide rails so as to move said biasing members sufficiently to allow said projections to clear said notches and to thereby permit said cartridge to be removed.

6. The cartridge latching mechanism of claim 5 further including a resilient stop means located remote from said mouth of said recess for limiting the movement of said cartridge.

7. The latching mechanism of claim 5 wherein each said resilient member is comprised of three generally planar areas:
a first generally planar area for fixing said resilient member to a support means;
a second generally planar area, bent out of the plane defined by said first planar area, toward said rails; and
a third generally planar area, bent out of the plane defined by said second planar area, towards the plane defined by said first planar area.

* * * * *